Sept. 16, 1941.  W. L. BRALEY ET AL  2,256,310
HITCH FOR TRAILER VEHICLES OR IMPLEMENTS
Filed July 26, 1939
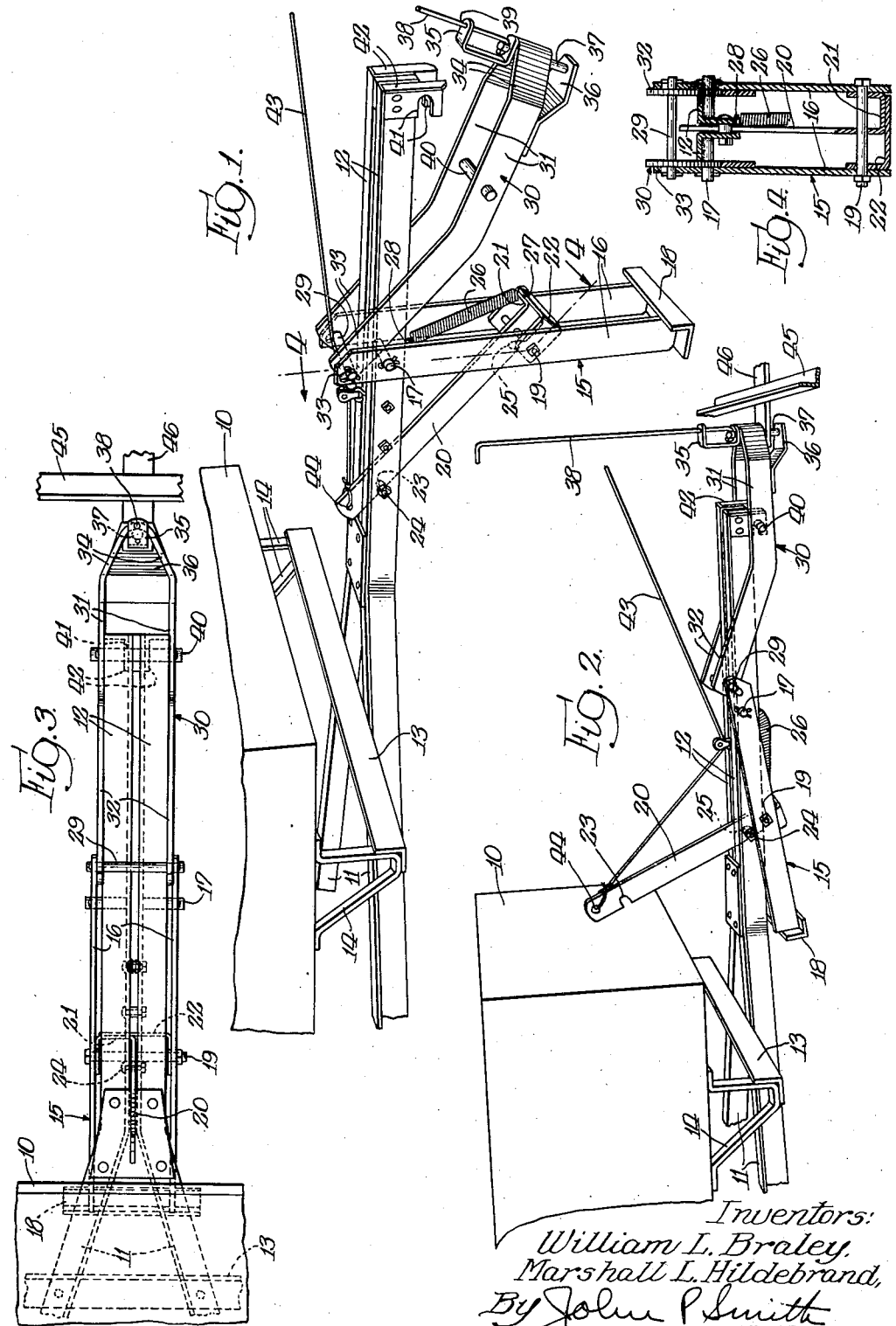
Inventors:
William L. Braley,
Marshall L. Hildebrand,
By John P. Smith
ATTORNEY.

Patented Sept. 16, 1941

2,256,310

UNITED STATES PATENT OFFICE 2,256,310

HITCH FOR TRAILER VEHICLES OR IMPLEMENTS

William L. Braley and Marshall L. Hildebrand, Springfield, Ohio, assignors to Oliver Farm Equipment Company, a corporation of Delaware Application July 26, 1939, Serial No. 286,506

7 Claims. (Cl. 280—33.44)

The present invention relates generally to a hitch connection between a trailer vehicle or implement and a motor vehicle, but more particularly to a novel type of hitch which also can be utilized for supporting the tongue or forward end of the trailer vehicle or implement in position so that the hitch may be adjusted from the operator's seat on the motor vehicle to facilitate the operation of connecting the connection therebetween.

A further object of the invention is to provide a novel and improved implement hitch for tractor in which a supporting leg is pivoted to the tongue or draft member of the implement and automatically actuated to inoperative, non-supporting position by the draft of the tractor.

Another object of the invention is to provide a novel and improved construction of an implement hitch for tractor by means of which the rearward movement of the tractor may be employed to actuate a supporting leg into supporting position so as to support the draft member or tongue of the implement in raised or elevated position.

A still further object of the invention is to provide a novel and improved construction of implement hitch by means of which the forward end of the draft member or tongue is held in elevated position and is provided with a floating supplemental connection which may be adjusted from the operator's seat on the tractor to the proper elevation so that the draft bar of the tractor may be easily connected thereto without dismounting from the tractor.

These and other objects are accomplished by providing a construction and an arrangement of the various parts in the manner hereinafter described and particularly pointed out in the appended claims.

Referring to the drawing:

Fig. 1 is a perspective view showing the manner in which the leg supporting member is supporting a forward end or tongue of an agricultural implement such as a manure spreader prior to connecting the same to the tractor;

Fig. 2 is a similar view showing the position of the operative connections of the tractor hitch when the same is operatively connected to the draw bar of a tractor;

Fig. 3 is a top plan view of our improved hitch in the position shown in Fig. 2; and Fig. 4 is a cross-sectional view taken on the lines 4—4 in Fig. 1 of the drawing.

For the purpose of illustration we have shown our improved tractor hitch and implement support in connection with a two wheel trailer type of manure spreader, the body and wagon portion of which is shown in fragmentary form and generally indicated by the reference character 10. With this trailer type of implement the intermediate portion is supported on an axle and a pair of wheels not shown in the drawing. Connected to the forward portion of the body or frame 10 are converging angles or main draft members 11 which have their forward portions as shown at 12 spaced apart and extending parallel with respect to each other so as to form a tongue or the main draft member of the hitch. The body 10 of the manure spreader is supported on converging portions 11 of the main draft member or tongue 12 by a supplemental transverse frame member 13 and brace members 14.

The tongue or main draft member 12 is supported in elevated or horizontal position when not connected to the tractor by a supporting leg generally indicated by the reference character 15. This supporting leg 15 comprises two oppositely disposed flat steel members 16 which are pivoted on a pin or bolt 17 extended through aligned apertures at approximately the center of the main draft member 12. Secured to the lower end of the supporting member 16 is a ground engaging shoe 18. Pivotally connected by means of a bolt 19 intermediate the ends of the leg members 16 is a locking link 20. The lower end of the link 20 has a U-shaped portion as shown at 21. Secured to the bottom part of the U-shaped portion 21 is L-shaped bracket 22 so as to form a rigid pivotal support for the lower end of the link 20 on the pin or bolt 19. Located adjacent the upper end of the link 20 is a slot or recess 23 which is adapted to engage and lock in a transverse bolt 24 extending through aligned apertures in the rear portion of the main draft members 12. Located at a point adjacent the lower end of the link 20 is a second slot or recess 25. This slot or recess 25 is adapted to engage the same bolt 24 when the supporting leg 15 is locked in its inoperative position or the position shown in Fig. 2 of the drawing. The link 20 is normally pressed into engagement with the bolt 24 by means of a spring 26 which has its lower end connected as shown at 27 to the lower portion of the link 20 below the pivot 19. The upper end of the spring is connected as shown at 28 to one of the main frame draft members 12. Pivotally connected to the upper ends of the supporting leg members 16 above their respective pivots 17 by means of a pin or bolt 29 is a floating supplemental draft actuated member generally indicated by the reference character 30. The supplemental draft member 30 comprises two spaced apart and longitudinally extending flat bars 31 which have their rear portions as shown at 32 bent slightly upward with respect to their forward portions. The pin 29 extends through aligned slots 33 in each of the upper ends of the supporting members 16 so as to afford a slight lost motion movement of the supplemental draft member 30 with respect to the supporting legs for the purpose hereinafter set forth. The rearward ends of the supplemental draft member 31 are located inwardly of each of the supporting members 16 and outwardly of each of the main draft members 12 so that the lower edge of the members 31 are adapted to rest on the bolt 17 when the supplemental draft member 30 is in its lowermost position or the position shown in Fig. 1 of the drawing. The forward portion of the supplemental draft member 31 converge as shown at 34 and have supported thereon a guide bracket 35 of U-shaped formation. Secured to the lower edges of the supplemental draft member 31 is an angularly disposed draft clevis 36. Reciprocally mounted in aligned apertures in the draft clevis 36 and the lower portion of the guide bracket 35 is a draft pin 37. Connected to the upper end of the draft pin is a control rod 38 which is adapted to be reciprocated through an aperture 39 in the guide bracket 35. The control rod 38 extends upwardly so as to be within easy reach of the operator's seat of the tractor. Located intermediate the ends of the supplemental draft member 31 is a transverse pin or bolt 40 which is adapted to move into engagement in the opposite slots 41 formed in the opposite brackets 42 secured to the forward end of the main draft members 12. In order to control the position of the supporting leg 15 we have provided a cord or rope 43 which has one end connected as shown at 44 in an opening at the upper end of the link 20 while the other end of the rope is attached within easy reach of the operator's seat on the tractor. In Fig. 2 of the drawing we have illustrated a fragmentary portion of the tractor which includes a frame member 45 and a pivoted draw bar 46, the outer end of which is provided with an aperture to engage the pin 37 for connecting the hitch to the draw bar thereof.

Summarizing the advantages and operation of our improved hitch, let us assume that the two wheel trailer type implement is in the position shown in Fig. 1 of the drawing with the leg 15 supporting the main draft member in horizontal position and that the operator is desirous of operatively connecting the draft bar 46 of the tractor to the supplemental floating draft member 30 of the hitch. From the operator's seat on the tractor the upper end of the rod 38 is gripped by the operator and raised so that the pin 37 is raised upwardly with respect to the draft clevis 36 until the top of pin strikes the bracket 35 and then the supplemental floating draft member 30 is lifted or adjusted about its pivot on the pin 39 to the proper elevation of the draft bar 46 of the tractor. When the aperture in the draft bar 46 is in alignment with the pin the operator depresses the rod 38 to engage the draft bar 46. When the tractor is thus connected to the supplemental draft member 30, then the cord 43 is drawn forward from the operator's seat, disengaging the notch 23 of the link 20 and upon a forward movement of the tractor the supplemental draft member 30 is moved horizontally relative to the main draft member 12 so that the pin 40 engages the recesses 41 in the brackets 42 and simultaneously swings the supporting legs 16 rearwardly to the position shown in Fig. 2 of the drawing. When the supporting leg 15 is swung to its inoperative position or the position shown in Fig. 2, the spring 26 normally actuates the links 20 in a counter clockwise direction about the pin or bolt 19 so that the notch 25 will engage the bolt 24 and lock the supporting leg in its inoperative position or the position shown in Fig. 2 of the drawing. In this connection it will be noted that the slots 33 in the upper end of the supporting leg members 16 permit a slight longitudinal movement of the supplemental draft member 30 so that pin 40 engages the slot 41 and the pin or bolt 29 rests upon the upper surface of the main draft members 12 so as to sustain the full forward weight of the forward end of the manure spreader.

Should the operator desire to disconnect the tractor and support the forward end of the tongue 12 on the supporting leg 15, the cord or rope 43 as shown in Fig. 2 of the drawing is pulled forwardly disengaging the recess 25 of the link 20 from the bolt 24 and upon a rearward movement of the tractor, the draft actuated member 30 is actuated longitudinally rearwardly, thereby actuating the support leg 15 about its pivot 17 to a vertical position as shown in Fig. 1. When the leg is in this position, the link 20 will automatically lock by having the notch or recess 23 engage the bolt 24 and secure the same in the position shown in Fig. 1 of the drawing. Then the control rod 38 may be lifted upwardly to disengage the draft pin 37 from the draft bar 46 of the tractor.

From the above description it will be readily understood that while we have specifically illustrated and described our invention as being applicable to a tractor hitch for agricultural trailer type implements, the same is equally adapted as a hitch for any type of vehicle trailer such as is commonly used in connection with trailer trucks, automobiles and the like.

While in the above specification we have described one embodiment which our invention may assume in practice, it will of course be understood that the same is capable of modification and that modification may be made without departing from the spirit and scope of the invention as expressed in the following claims.

What we claim as our invention and desire to secure by Letters Patent is:

1. A hitch for a trailer type implement or the like comprising a main draft member, a supporting member pivoted to said draft member, and a bodily movable draft means operatively connected to said supporting member and to said main draft member for controlling the position of said supporting member.

2. A tractor hitch for a trailer type vehicle or implement comprising a main draft member, a supporting member pivoted intermediate its ends to said main draft member, means for locking said supporting member in its operative and inoperative positions, a supplemental draft actuated member pivoted to the upper end of said supporting member and engageable with said main draft member, and means within easy reach of the operator's seat on the tractor for controlling said locking means.

3. A tractor hitch for a trailer type vehicle or implement comprising a main draft member, a supporting member operatively connected to and for supporting said draft member in an elevated position above the ground, a floating supplemental draft member operatively connected to both of said members, and means within easy reach of the operator's seat on the tractor for adjusting the height of said floating draft member for connection to the tractor.

4. A tractor hitch for a trailer type vehicle or implement comprising a main draft member, a supporting member pivoted to said draft member for supporting the forward end of said implement in elevated position, a vertically movable floating supplemental draft member pivoted to said supporting member and engageable with said main draft member, means operable from the operator's seat on the tractor for adjusting the height of the supplemental draft member to that of the draw bar of the tractor, and means for automatically locking said supporting member in operative and inoperative positions.

5. A tractor hitch for a vehicle or implement comprising a main draft member, a supporting member pivoted to said draft member for supporting said draft member in elevated position, a vertically movable supplemental draft member pivoted to said supporting member and engageable with said main draft member, means operable from the operator's seat on the tractor for adjusting the height of the supplemental draft member to that of the draw bar of the tractor, means for automatically locking said supporting member in operative and inoperative positions, and means operable from the operator's seat on the tractor for unlocking said locking means.

6. A tractor hitch for a vehicle or implement comprising a main draft member, a supporting member pivoted to said draft member, a longitudinally and vertically movable supplemental draft member having its rear end pivotally related to said supporting member, means carried by said supplemental draft member adapted to engage said main draft member, a draft clevis carried at the forward end of said supplemental draft member, a draft pin reciprocally mounted in said clevis, and means operable from within easy reach of the operator's seat on the tractor for removing said pin from said clevis and for adjusting the height of said supplemental draft member to the height of the draw bar of the tractor.

7. A tractor hitch for a vehicle or implement comprising a main draft member, a supporting member pivoted to said draft member, a longitudinally and vertically movable supplemental draft member having its rear end pivotally related to the upper end of said supporting member, means carried by said supplemental draft member and engageable with said main draft member, a draft pin carried adjacent the forward end of said supplemental draft member, and means operable from the operator's seat on the tractor to control said pin and to adjust the height of said supplemental draft member in conformity to the height of the draw bar of the tractor.

WILLIAM L. BRALEY.
MARSHALL L. HILDEBRAND.